3,318,984
PROCESS OF MANUFACTURING ARTIFICIAL STONE ELEMENTS

Christian Germain Louis Dussel, Domaine de Ronceval, Toulouse-Montaudran, France
No Drawing. Filed July 17, 1963, Ser. No. 295,805
Claims priority, application France, July 19, 1962, 904,549, Patent 1,329,325
1 Claim. (Cl. 264—77)

The present invention relates to a process of manufacturing high-quality artificial stone elements, whose appearance is very similar to the genuine stone of the corresponding kind, in an extremely economical and rapid fashion, such as particularly tiles, slabs or coating panels of artificial marble, having the colours, spots and veins of genuine marble, directly won in quarries. A further object of the invention is the material resulting from the setting into effect of the above process, as novel industrial product.

Said process is characterized by the essential fact that the above elements are made of a basic material comprising a fine stone powder to which a suitable quantity of a mixture of carefully chosen heat-setting resins is added, which basic material is subjected to an initial mixing step in the cold state, with a view of obtaining an intimate mixture which is cast into moulds. The filled moulds are placed between the heated plates of a press and polymerization of the resins is obtained by heat. Said stage of transformation of state is immediately followed by the final stripping step and the thus finished products are ready for immediate use.

Owing to the extreme rapidity of the polymerization phenomenon of the employed heat-setting resins, the duration of which is practically in the order of two minutes, the present process allows of operating the presses at an extremely elevated rate of production, which explains the modest cost price of the material manufactured according to the present process.

The present process is moreover characterized by the fact that not only the choice of the above-mentioned resins can be varied, but also their rate of proportion in the mixture, so that the final products show determined physical properties, such as for instance various degrees of hardness, elasticity or flexibility, according to their use.

Another particular feature of the present process resides in the fact that the used basic material, owing to the high power of adhesion of the resins applied, allows the manufacture of heterogeneous materials which prove to be satisfactory under various conditions of use, and which are most simply obtained by the direct moulding of said basic material on auxiliary supports, having special properties, useful for instance for heat insulation, sound deadening or rendering tight and the like.

The advantages and improvements brought about by the invention will be more evident from the following description of one method of manufacturing artificial marble tiling, which is given by way of example and for purposes of illustration but not of limitation.

The first step comprises the separate preparation of pastes of distinct colour shades by mixing in the cold state one of several pulverized marbles of different colours with the same proportion of a mixture of carefully chosen polyester resins, one of which pastes is adapted to form the main portion of the articifial marble element, whereas the other paste or pastes will form the manifold spots or veins appearing on the surface of said elements.

After these pastes have been prepared, the moulds are charged, which in the case under consideration, are constructed in a very simple manner, i.e., they comprise a base plate, which in an economical way is made of steel for instance, supporting one or several flat-iron frames, whose inner faces make contact with the side walls of the tiles to be manufactured.

A movable plate, equally consisting of steel, is fitted into each frame with sliding friction, and its position within the frame, defining the desired thickness of the tile to be manufactured, is materially determined by an appropriate thrust member.

The moulds as above described, are provided with the usual vent-holes through which air can escape, and which furthermore render possible the discharge of any excess of the material poured into the moulds. Those walls of the mould, adapted to make contact with the material to be moulded, are coated with a substance which avoids all risks of adherence of said material, which substance, e.g., can be an oil or a silicone wax.

Charging of the above moulds comprises two successive stages. In the first stage a pattern of tablets or threads, made of one or the other preliminarily prepared pastes, is laid out on the bottom of the moulds, so as to particularly form the spots and veins which are to appear on the surface of the tiles.

This pattern is laid out manually or in a more economical and faster fashion by means of a distributor, provided with stencils, allowing of producing in a single operation all the threads and tablets of the same colour.

The second stage of the charging operation consists in casting onto said deposits a sufficient quantity of the last paste, so as to completely fill the capacity of the moulds, which paste forms the main portion of the element of artificial marble. Immediately thereafter the movable plates are brought into position, which plates fit the interior of the frames, forming the side walls of said moulds, and which plates form the upper closure means of the cavities of the moulds.

After filling of the moulds they are arranged between manifold heating plates, arranged in tiers, of presses of appropriate type, in which presses polymerization of the polyester resins, which are incorporated into the various basic pastes, takes place, which phenomenon is completed in a short period of time of approximately two minutes, and results in the collective "setting" of said pastes.

Finally the tiles are stripped from the moulds and when leaving the moulds they are perfectly finished and can be used immediately. Owing to the absolute reciprocal affinity between the various pastes of distinct colours, which respectively form the main portion of the element of artificial marble and the spots and veins incorporated therein, which affinity is due to the fact that the pastes are made of identical compounds, a spontaneous progressive interpenetration of said pastes is brought about during the polymerization process, so that automatically localized gradation of hues is obtained, which is very similar to the one of genuine marble.

The present invention also covers any modifications of the details of the method of manufacture, described hereinbefore, which come within the scope of the present application, as for example the method of casting the basic material consisting of pulverized stone and heat-setting resins not directly on the bottom of the moulds, but onto the surface of auxiliary supports, preliminarily placed on the bottom of the moulds, whereas on the other hand, the inner faces of the frames forming the side walls of said moulds may be provided with recesses and projections which, along the sides of the element manufactured according to the present process, create tongues and grooves or tenons and mortises of conjugating profiles, allowing of positively securing adjoining elements when covering floors, walls and the like with said tiles.

In general the preceding description is not meant to limit the invention in any way as regards not only the forms of the artificial stone elements obtained according to the process which forms the object of the present invention, but also the nature of the pulverized stone and the heat-setting resins used, as well as the description of the industrial means applied for the obtention of said elements, which may be modified without leaving the scope of the present invention.

What I claim is:

A process of manufacturing reconstituted marble elements which simulate the appearance of natural quarried marble, comprising the steps of separately mixing, in the cold state, finely divided marble powders of different colors with the same proportions of identical thermosetting resins to obtain a plurality of intimate mixtures having the different colors of the respective marble powders, individually casting said plurality of mixtures in a mould to produce the veining and patterning characteristics of the appearance of quarried marble, subjecting the mould to heat and pressure to effect polymerization of said resins in the mixtures, and thereafter stripping the mould.

References Cited by the Examiner

UNITED STATES PATENTS

| | | | |
|---|---|---|---|
| 356,908 | 7/1887 | Chatain | 264—77 |
| 1,285,355 | 11/1918 | Perkins | 25—121 |
| 1,701,619 | 2/1929 | Kendall | 264—74 |
| 1,739,677 | 12/1929 | Kendall | 264—74 |
| 2,101,540 | 12/1937 | Gullich | 264—77 |
| 2,216,946 | 10/1940 | Hunter | 260—320 |
| 2,434,477 | 1/1948 | Winter | 264—77 |
| 3,110,949 | 11/1963 | Di Tullio et al. | 25—121 |

FOREIGN PATENTS 1,040,489  10/1953  France.

ALEXANDER H. BRODMERKEL, *Primary Examiner.*

J. R. DUNCAN, B. SNYDER, A. H. KOECKERT,
*Assistant Examiners.*